Oct. 11, 1932.                R. MITCHELL                1,881,836
                               CLINCH-ON NUT
                            Filed Feb. 15, 1926
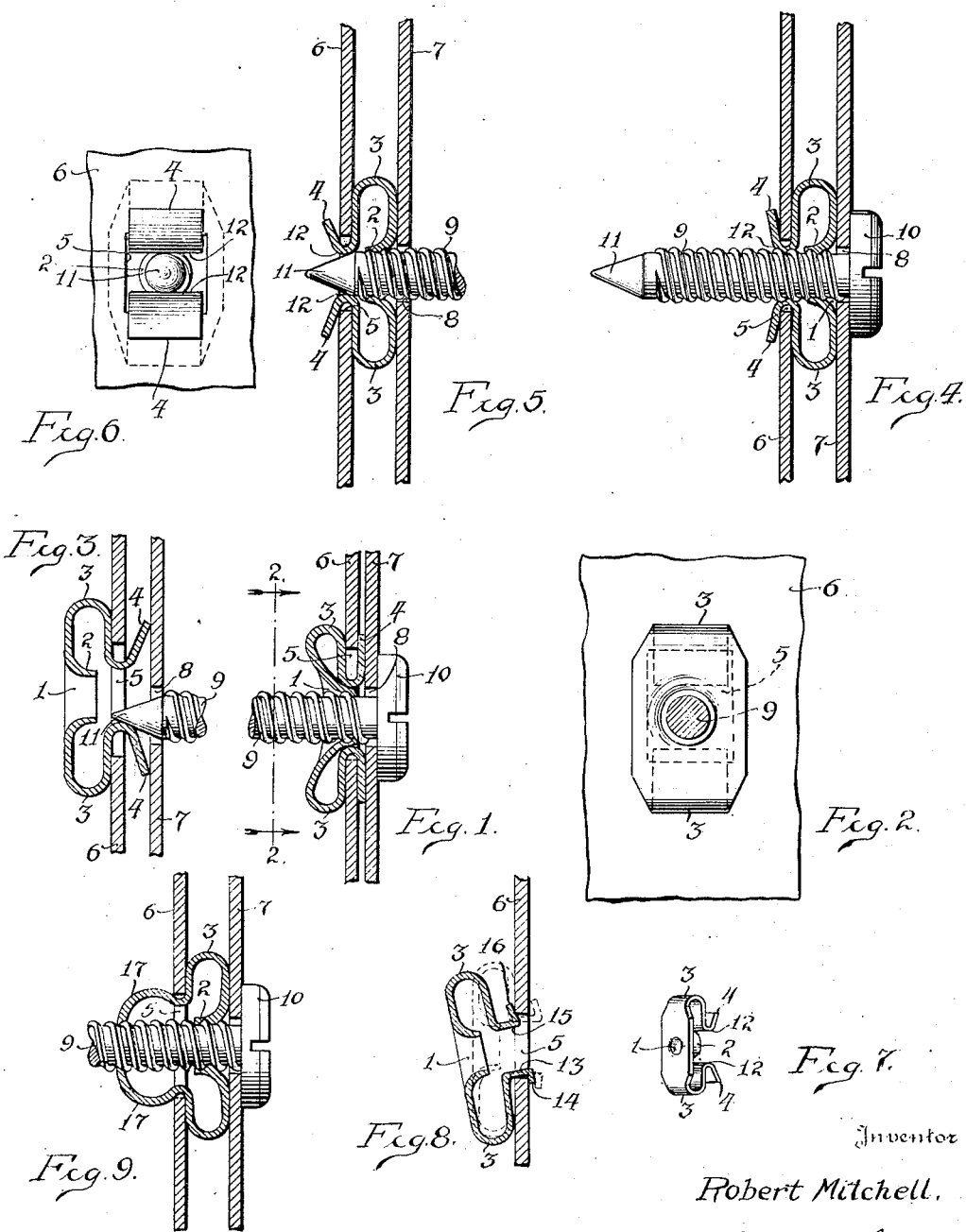

Patented Oct. 11, 1932

1,881,836

UNITED STATES PATENT OFFICE

ROBERT MITCHELL, OF DETROIT, MICHIGAN

CLINCH-ON NUT

Application filed February 15, 1926. Serial No. 88,314.

This invention relates to a device in the nature of a nut for use in connection with a bolt, screw or other threaded member, and which is particularly designed for and applicable to the securing of a member to a comparatively thin sheet metal plate or the like not adapted to be provided with a screw-threaded opening to receive the screw, and its object is to provide a simple device for the purpose which is cheap to manufacture and efficient in operation. A further object is to so construct the device as to provide a clinch-on effect for holding the device engaged with the screw and also with the member to be held thereby, whereby the screw is securely locked in place and the device is interlocked with the member to be held to preclude accidental displacement of the parts, and also the production of a sheet metal clinch-on nut adapted to increase its own effective anchorage by spring stress, and adapted for rigid anchorage from a floating interlock with a sheet metal wall or like work. A further object is to so construct the device as to provide a limited floating movement thereof whereby the screw may be engaged therewith and the members secured together thereby when the screw hole in the member to be secured in place is out of alignment with said device carried by the other member. It is also an object to provide a device particularly adaptable for use in the manufacture of metal automobile bodies and embodying certain other new and useful features, all as hereinafter more fully described.

With the above and other ends in view, the invention consists in the matters hereinafter set forth and more particularly pointed out in the appended claims, reference being had to the accompanying drawing, in which Figure 1 is a longitudinal section through a device illustrative of the invention and showing the same as applied in use;

Figure 2 is an elevation of the same with a screw-threaded anchorage member shown in section;

Figure 3 is a sectional view illustrating the manner in which the device is applied and before a connecting screw is inserted;

Figure 4 is a view similar to Figure 1 showing a slightly modified construction and illustrating another way in which it may be used;

Figure 5 is a view similar to Figure 4 illustrating the position of the device before the complete insertion of the screw;

Figure 6 is an elevation of Figure 5;

Figure 7 is a perspective view of the device embodying the invention and shown in Figures 4 to 5 inclusive;

Figure 8 is a sectional detail of the device showing a further slight modification and illustrating the manner in which it is inserted in an opening; and Figure 9 is a further modified form of the device showing the same in section and as applied in use.

In the manufacture of sheet metal automobile bodies, there are many places where it is necessary to secure two comparatively thin sheets of metal together or secure a trim rail or other part to a single thickness of sheet metal, and due to the thinness of the metal, it is difficult to provide a screw-threaded opening therein which will provide sufficient engagement with the thread of a securing screw to hold the parts securely connected, and further, when the screw is simply engaged in a burrless opening in the thin metal, the screw is liable to become loose and work out. Also where the holes in the two plates are not in proper alignment, it is necessary to provide movable means in the hole in one plate to receive the screw, which means will be adjusted by the insertion of the screw, into alignment with the hole in the other plate.

The device embodying the present invention, may be called a clinch-on nut as it serves the purpose of a nut and also grips or clinches the screw to which it is applied and also clinches into the opening in the sheet metal to which it is applied so that it is firmly held therein in operative position prior to the insertion of the screw. The device will therefore, hereinafter be called a clinch-on nut and it is obvious that such a device may be used wherever it is desired to secure two members together by means of a screw or the like and where it is desirable that the nut be held in place upon one member while the screw is being inserted. Also where it is impossible or undesirable to screw-thread an opening in one member to receive the screw and where a lock washer is usually necessary.

The clinch-on nut shown in the drawing, is preferably formed of sheet metal and comprises a strip of such metal pierced intermediate its ends to provide a screw receiving hole 1, the metal being punched laterally in forming the hole to provide a laterally projecting annular flange or burr 2 surrounding the hole at one side of the strip. The strip is then bent to form a spring loop 3 at each of the opposite sides of the flanged hole 1, with the free ends 4 of the strip given a reverse bend to provide hooked end portions on the strip adapted to be engaged within an opening 5 punched or formed in one member or plate 6 of the two members to be held together by the clinch-on nut, the other member or plate 7 being also formed with a hole 8 to receive the screw-threaded member 9 having a head 10 to seat upon the outer face of the plate 7 and a screw-threaded shank portion to enter the hole 1 in the clinch-on nut. This hole 1 is of lesser diameter than the screw-threaded shank so that when the screw is turned in, its threads will cut into the flange 2 surrounding the opening 1 and afford a secure engagement therewith. To afford easy entry of the screw into the hole 1, its end is preferably pointed as at 11 and preferably, said screw is formed with a coarse thread and hardened so that it will bite into the sheet metal flange surrounding the hole 1 in the nut and have a firm hold thereon, the spring tension of the loops 3 aiding in making the engagement effective.

As illustrated in Figs. 1, 2 and 3, it may happen that the hole 8 in one plate does not exactly align with the hole 5 in the other plate, as for instance, in automobile body building where the sheet metal is first punched and then formed into shape, and often the plate 6 and hole 5 therein is concealed so that a new hole cannot be punched or the hole enlarged in the concealed plate. In instances where such disalignment is liable to occur, the hole 5 is made larger than the hole 8 and the hooked ends 4 of the nut member are extended sufficiently to hold the nut in place in the enlarged hole, thus permitting a floating movement of the nut in the hole but at the same time holding the nut in place therein so that when the screw is inserted, said screw will, by the engagement of its end with the nut, move the same into alignment with the hole 8, and as the hooked ends 4 of the nut can not be disengaged from the hole 5 by such movement, the screw may be turned in, drawing the yielding center portion of the nut through which the screw threads itself, inwardly and forcing the two plates toward each other with the end portions 4 of the strip forming the nut, clamped therebetween and the flange 2 drawn into firm contact with the bends 12 of said end portions, thus locking said end portions against movement toward the screw and consequently against escape from the enlarged opening 5. This clinch-on nut may therefore be used in constructions where it is entirely concealed and where it can not be reached to place it or adjust it where it is desired to secure the outer member 7 in place, as is often the case in body building, where a finishing strip is to be secured to an inner wall of a sheet metal body. In such instances, these nuts are snapped into the holes formed in the sheet or wall 6 during the building of the body and are firmly held in said openings by the spring action of their hooked end portions 4 while the body is being completed so that they will be in position to receive the holding screws when the finishing strip or member 7 is applied.

The action of the screw 9 in drawing the central portion of the strip inwardly, not only draws the flange 2 inwardly between the bends 12 of the end portions 4 of the nut to prevent their disengagement from the opening 5, but also, due to the loops 3, puts these loops under heavy tension as shown in Fig. 1, so that the flange 2 binds the screw sufficiently to firmly lock it against accidental turning, and this binding action is further increased by the drawing of the flange inwardly between the bends 12 of the hooks. This clinch-on nut thus serves as a nut and as a lock washer, and further, may be applied to the opening in one member or plate and will be held in position to be engaged by the securing screw, bolt or other threaded member when the outer member or strip 7 is to be secured in place. The construction of this clinch-on nut is also such that the outer member or finishing strip 7 may be removed at any time by unscrewing the screw, and the nut will remain in place to again receive the screw when the strip is replaced.

This clinch-on nut may also be applied as illustrated in Figs. 4, 5 and 6, with the nut lying between the plates 6 and 7 and with the hooked ends 4 only, engaged through the opening 5 in the plate 6 to hold the two plates together. But in this arrangement the bends 12 of the hooked ends 4, are normally spaced apart a distance less than the diameter of the screw, so that when the screw is projected therebetween, the screw-thread will cut into these bends and the bends will be spread apart thereby, forcing and holding the hooks into engagement with the wall or plate adjacent the opening 5 therein.

A slightly modified construction of clinch-on nut is illustrated in Fig. 8. In this form, the hook ends of the strip forming the nut, are so formed that they may be more easily inserted in the opening in the member 6, this being especially advantageous where the hole 5 in said member is not of much greater diameter than the diameter of the screw to be inserted therethrough, or in constructions where it is not necessary that the nut move in its opening to align with an opening in the member or plate to be secured thereto. One of these hooks is formed by bending the metal at substantially right angles to the side of its loop 3, forming a straight portion 13 to engage one side of the opening, and then again bent at substantially right angles to form a short hook end 14, the straight portion 13 being somewhat longer than the thickness of the metal forming the plate 6 so that the hook may be inserted through the opening and engaged over the edge of the opening with the nut in a tilted position as illustrated, then by springing the loop at the other side of the nut, the hook 15 at that side may be snapped into the opening, the outturned end 16 of said hook being inclined slightly from a right angle bend to provide an inclined surface to engage the upper edge of the opening and assist in springing the hooked ends into the opening. By inclining the bent end 16 toward the side of the adjacent loop 3, the distance between said end 16 and side of loop is lessened to conform to the thickness of the metal of the plate 6 and thus firmly hold the nut in place in the opening in the plate.

A further modified form of clinch-on nut is illustrated in Fig. 9, this form being especially adapted for use in a manner similar to the application illustrated in Figure 4 where the body of the nut is positioned between the plates 6 and 7, and the construction is the same with the exception that the hook shaped ends, instead of being turned outwardly or away from the screw after passing through the opening 5, are extended and curved inwardly or toward the screw as shown at 17, with their extreme ends normally spaced apart a distance less than the diameter of the screw so that when the screw is inserted, these ends will be engaged thereby and spread apart to lock the hooks within the opening and so that the screwthread will cut into these ends to hold and bind the screw.

Obviously other modifications may be made in the form and construction of the clinch-on nut to suit the particular conditions of use and the size, proportion and arrangement of parts may be changed within the scope of the appended claims without departing from the spirit of the invention, and I do not, therefore limit myself to the particular constructions and applications of the invention shown.

Having thus fully described my invention, what I claim is:

1. A clinch-on nut comprising a yieldable metal strip having an opening intermediate its ends and end portions bent laterally and free to snap into an opening in one member of a pair of members to be secured together by said device when said end strip is flexed to enter said end portions into the opening, and a member having a hardened screw-thread to cut a thread in the opening of said strip when inserted through an opening in the other member of the pair of members and through said opening in the first mentioned member between said end portions of the strip and screwed into the opening in the strip, said screw-threaded member being provided with a head to engage one of the members of the pair and force the same toward the other member thereof with said end portions of the strip between said members when the said screwthreaded member is turned in.

2. A device for securing a member having an opening therein, to a sheet metal member having an opening of greater area than the corresponding opening in the other member; said device comprising a sheet metal strip having an opening intermediate its ends with said strip bent to form a spring loop at each side of said opening and with the free end portions of said loops outturned and extended well beyond the margin of said opening of large area in the sheet metal member when inserted therethrough, said end portions being of a length to permit movement of the device relative to said large opening in the sheet metal member without becoming disengaged therefrom, and a securing member having a hardened screw-thread for insertion through the openings in said members into engagement with the opening in said device with its hardened thread cutting into the metal surrounding said opening.

3. A device as characterized in claim 2 and wherein said sheet metal strip is formed with a flange struck laterally out of said opening therein and extending toward the free end portions of said loops, said free end portions of said loops being spaced apart to receive said flange between them when the loops are compressed by the screwing in of said screwthreaded member.

4. A clinch-on nut comprising a single strip of sheet metal providing a central portion formed with an integrally flanged opening adapted to receive a screw in threaded engagement with the flange thereof, and arms extending from said central portion and bent to form loops spaced from said portion having hooked ends forming work-engaging end portions and free to yield for insertion through an opening and to spring away from each other when so inserted to engage said hooked ends with the work and hold the device within the opening, said arms being of spring metal and said end portions thereof being bent laterally in opopsite directions, and a securing member having a hardened thread to cut into the flange of the flanged opening.

5. A device for the purpose described formed from a single resilient sheet metal strip provided with a flanged opening intermediate its ends to receive a hardened screw-threaded member adapted to cut threads in said flanged opening, said strip being bent inwardly to form spring loops at opposite sides of said flanged opening and with free end portions again bent outwardly to engage within an opening in a member to which the device is to be attached.

6. In a building structure, the combination with sheet metal work and an article to be anchored thereto, of a sheet metal clinch-on nut having a body spaced from the work and formed with a burred opening, and arms extending from the body through the work, and a hardened thread screw extending through the article to be anchored and having a head engaging the same, said screw extending through the burred opening with the thread entering the material of said burr.

7. In a building structure, the combination with sheet metal work and an article to be anchored thereto, of a sheet metal clinch-on nut having a body formed with a burred aperture, said body being spaced from the work and article and having spring arms extending through one of the two last named elements, and a hardened thread screw extending through the said two last named elements and having a head engaging one of them, said screw extending through the aperture in the body of the clinch-on nut with the thread of the screw entering the material of said burr and stressing said body for retaining the spring arms under tension.

8. The combination of two fixed members to be secured together and having openings out of axial alinement with each other, one of said openings being of greater area than the other, a securing member loosely engaged in said large opening to float therein and connected to said member against accidental removal from said opening therein, a screw-threaded member passing through the smaller opening in one of said members and through said floating member whereby said members are secured together by said screw-threaded member passing through the alined openings in the members, said floating member comprising a sheet metal strip having an opening and end portion bent to enter the large opening in one of the members and loosely connect said floating member to said member having the opening, said screw-threaded member having a hardened screw-thread to cut into the wall of the opening in the floating member.

In testimony whereof I affix my signature.

ROBERT MITCHELL.